United States Patent [19]

Taylor

[11] Patent Number: 4,564,225
[45] Date of Patent: Jan. 14, 1986

[54] MULTIPLE LEAD THREADING

[76] Inventor: Vernon W. Taylor, 3923 Pleasant Valley, Missouri City, Tex. 77459

[21] Appl. No.: 545,821

[22] Filed: Oct. 27, 1983

[51] Int. Cl.$^4$ ............................................. F16L 25/00
[52] U.S. Cl. .................................... 285/333; 285/355; 285/390
[58] Field of Search ................ 285/333, 334, 355, 390

[56] References Cited
U.S. PATENT DOCUMENTS 1,515,617 11/1924 Reynolds et al. ............... 285/334 X
1,904,675 4/1933 Boyer ................................... 285/390

Primary Examiner—Richard J. Scanlan, Jr.
Attorney, Agent, or Firm—Robert W. B. Dickerson

[57] ABSTRACT

Mechanism for joining together sections of casing or tubing, whereby the exterior ends of adjacent casing or tubing sections and the opposite interior ends of a coupling device are matingly threaded, the threading thereof having plural leads.

1 Claim, 4 Drawing Figures

MULTIPLE LEAD THREADING

BACKGROUND OF THE INVENTION

During the exploration for and the production of hydrocarbon products, i.e., oil and gas, like sections of casing are joined together, and like sections of tubing are also joined together for insertion down hole. Such joining together is normally accomplished by means of an intermediate coupling member. Commonly, such coupling member has oppositely directed threads interior of its opposed ends. Facing ends of adjacent casing or tubing sections, being exteriorly threaded, are then engaged and made up with said coupling ends. Certain problems have consistently occurred in the field where strings of casing and tubing are assembled. These problems have included the following (1) relative slowness in make-up, (2) tendency of the threads to gaul, especially when the coupling is broken loose, and (3) cross threading occurring, especially during make-up. Attempting to overcome these problems led to Aplicant's invention.

SUMMARY OF THE INVENTION

Some prior art utilization has been made of thread arrangements having plural leads. A search performed produced the following U.S. Pat. Nos. references: 1,407,335; 1,515,617; 1,645,032; 1,733,392; 1,802,668; 2,793,884; 2,885,225; 3,388,935; 3,794,364; 3,813,115; 3,876,319; and 3,917,319. None of the references found taught the use of plural leads in the thread system used on casing or tubing or on the coupling mechanism used to join together adjacent sections. Applicant's arrangement contemplates exteriorly threading the male (casing or tubing) member, interiorly threading the female (coupling) member, with all such threads having multiple leads.

DESCRIPTION OF A PREFERRED EMBODIMENT

Figure 1:
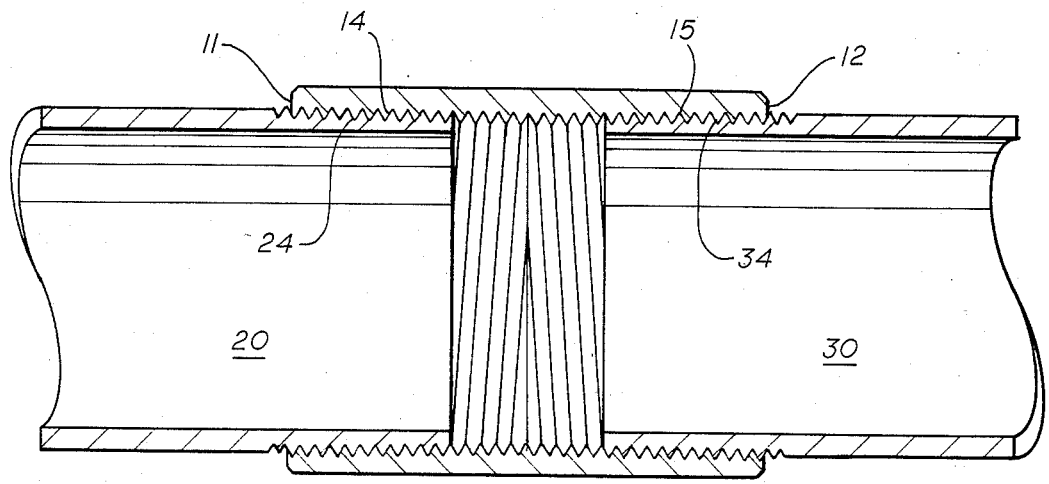
FIG. 1 is a vertical section through a made-up coupling.

The nature of this invention is clearly shown in the drawings. As previously stated herein, the inventive nature of this application pertains to the multiple-lead threading provided to casing and/or tubing, such products being commonly used in oil field exploration and production.

Figure 2:
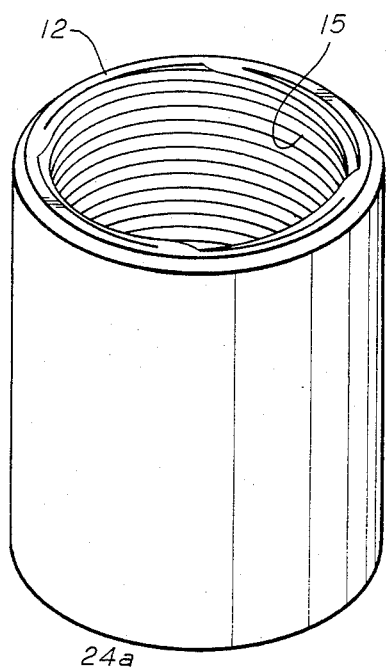
FIG. 2 is a perspective of the collar portion.
Figure 3:
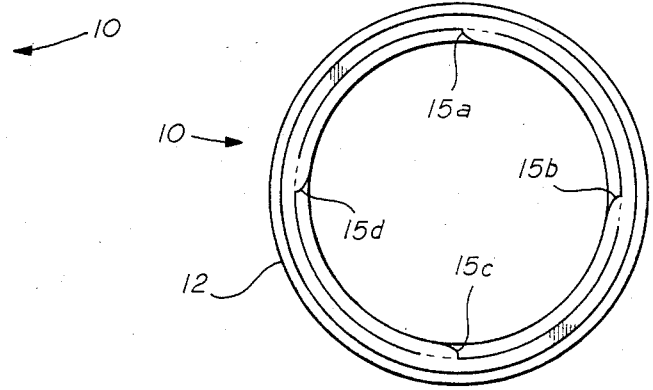
FIG. 3 is a top plan view of the collar.

FIGS. 1-3 depict a cylindrical collar, generally illustrated by numeral 10. Collar 10 includes an axial bore therethrough. The interior collar wall is interiorly threaded. Preferably such threading extends axially inward from each collar end, 11 and 12, to approximately the collar's axial center. Naturally such oppositely disposed threaded sections 14, 15 are threaded in opposite directions. Further, sections 14, 15 are radially tapered, i.e. collar 10 is thicker in the area of the collar's axial center than at collar ends 11 and 12.

Importantly, the threads comprising sections 14 and 15 possess multiple leads. As shown in FIGS. 2 and 3, there is a ninety degree rotational spacing between the four depicted leads, for example, those shown at 15-A,B,C,D.

Figure 4:
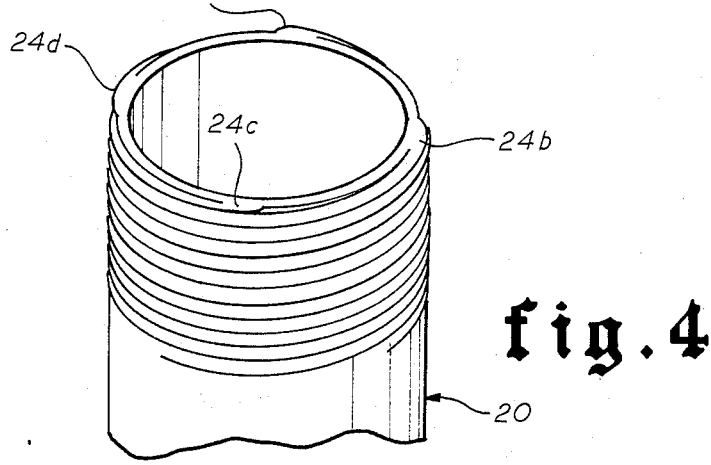
FIG. 4 is a partial perspective of one of the casing or tubing sections.

FIG. 4 represents one end of either section 20 or 30, as shown in FIG. 1. As previously mentioned, such sections may be casing or tubing. Each casing or tubing end (only one end being shown in FIGS. 1 and 4) would be threaded, as at 24,34. The opposite ends of sections 20 and 30, not shown, would be similarly threaded, but in the opposite direction. For mating purposes with collar 10, threaded sections 24, 34, would be slightly tapered (at approximately the same angle of taper as collar sections 14, 15), and would have multiple leads (such as 24-A,B,C,D of FIG. 4) each being rotationally spaced by ninety degrees from its adjacent leads.

The typical thread form used is not critical to Applicant's invention. He has used buttress threads with a pitch of 5 per inch, and 8-round thread with its pitch of 8 per inch. It has consistently been found that field make-up or knock-down time is decreased, and any tendency to gaul and/or cross thread is greatly reduced. Applicant believes himself to be the first to teach the utilization of the concept of multiple lead threading in the art in question.

While only a single embodiment, i.e., 4-leads, has been depicted, it should be obvious that numerous embodiments would be possible by one skilled in the art without departing from the spirit of the invention, the scope of which is limited only by the following claims.

I claim:

1. In a coupling system for use in a drilling operation, the combination of:
   radially tapered, axially bored, interiorly threaded, collar means, said collar means' threads including plural leads from each of said collar means' opposite ends to approximately the axial center of said collar means; and
   a pair of tubular members, each having radially tapered, exteriorly threaded, ends, said threaded ends each having plural leads, said tubular members being adapted to be threadedly engaged with said collar means.

* * * * *